March 29, 1966 V. K. PELTOLA 3,242,730
AIR VELOCITY METERS
Filed Oct. 22, 1963 6 Sheets-Sheet 1
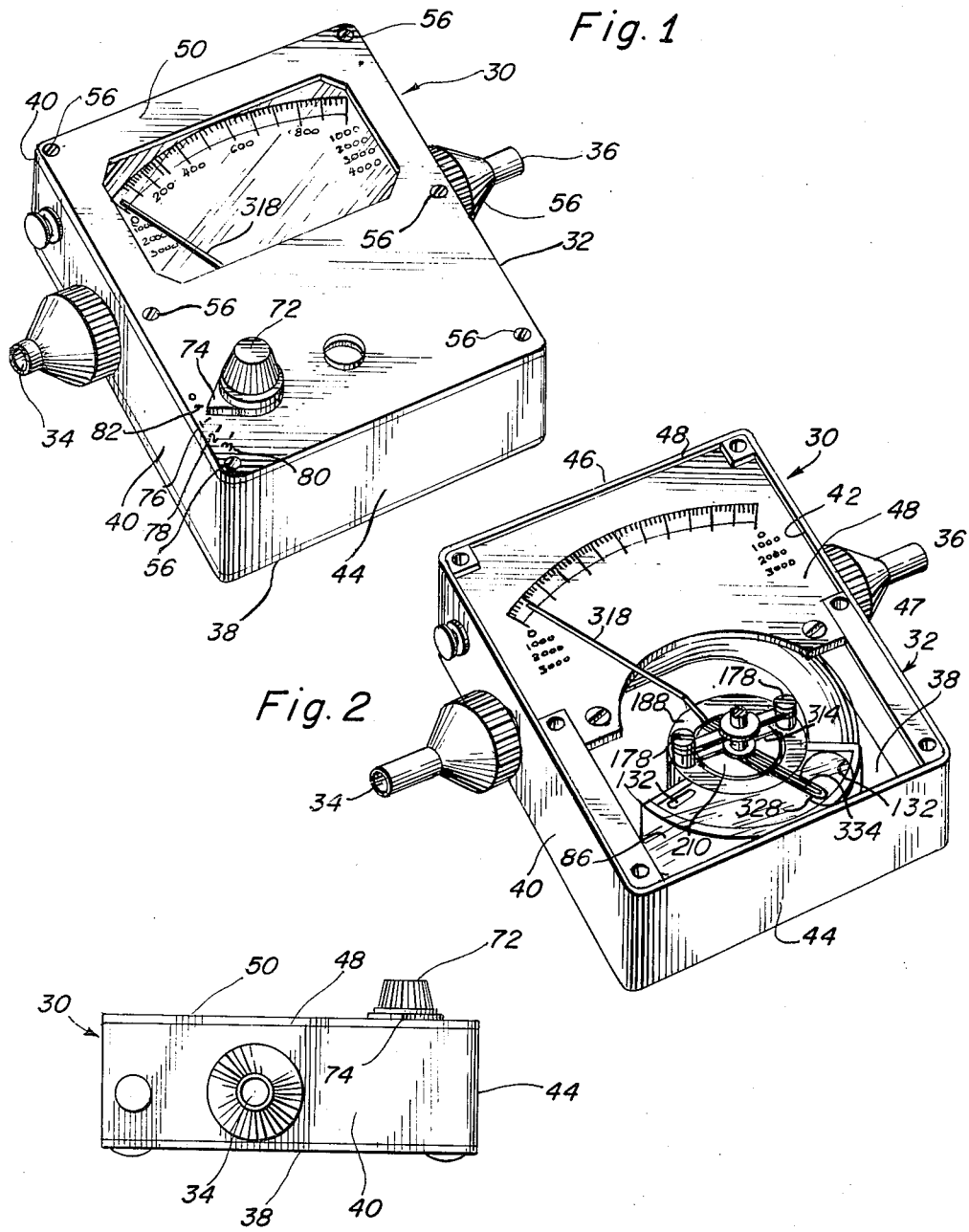
INVENTOR
Veikko K. Peltola
BY Robert H. Wendt
ATTORNEY

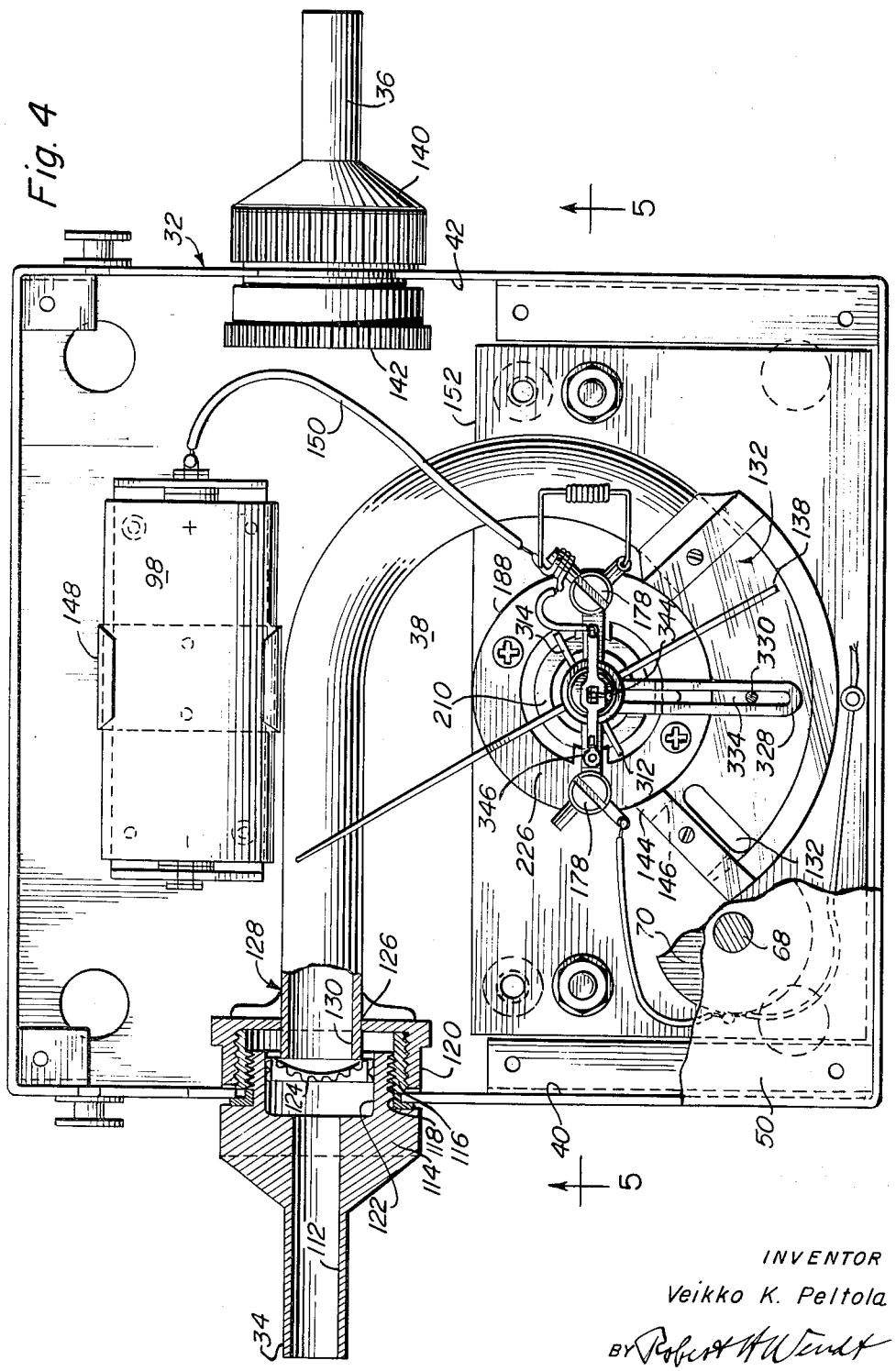

March 29, 1966  V. K. PELTOLA  3,242,730
AIR VELOCITY METERS
Filed Oct. 22, 1963  6 Sheets-Sheet 5

INVENTOR
Veikko K. Peltola
BY Robert H. Wendt
ATTORNEY

March 29, 1966 V. K. PELTOLA 3,242,730
AIR VELOCITY METERS
Filed Oct. 22, 1963 6 Sheets-Sheet 4
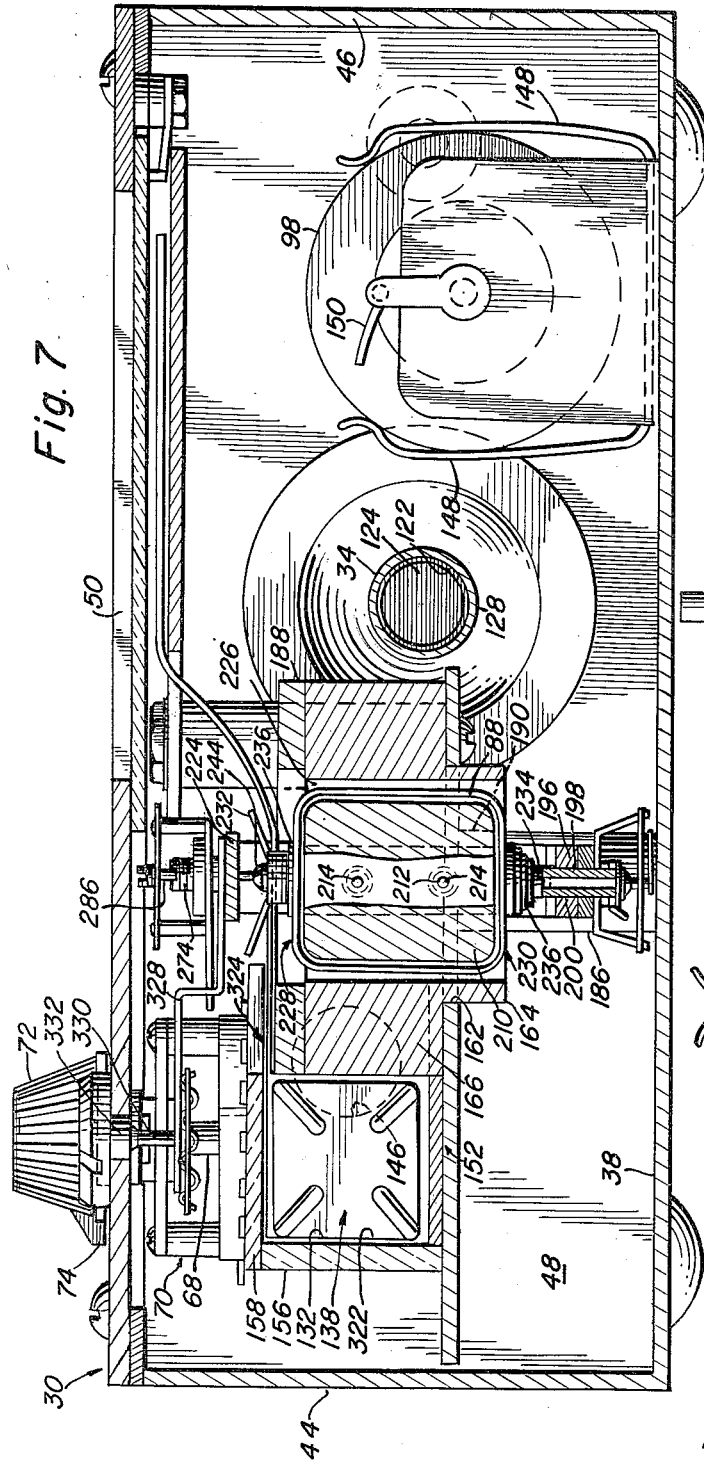
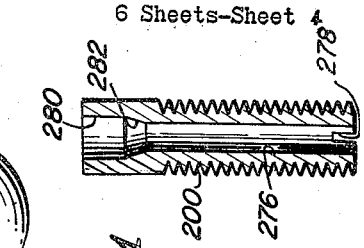
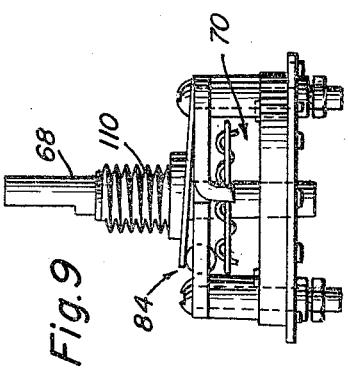
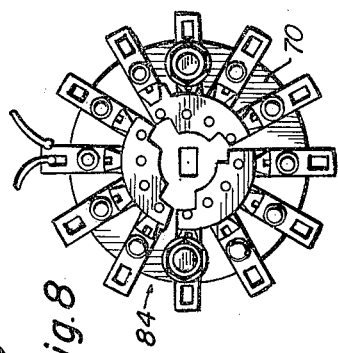
INVENTOR
Veikko K. Peltola
BY Robert H Wendt
ATTORNEY March 29, 1966  V. K. PELTOLA  3,242,730
AIR VELOCITY METERS
Filed Oct. 22, 1963  6 Sheets-Sheet 5
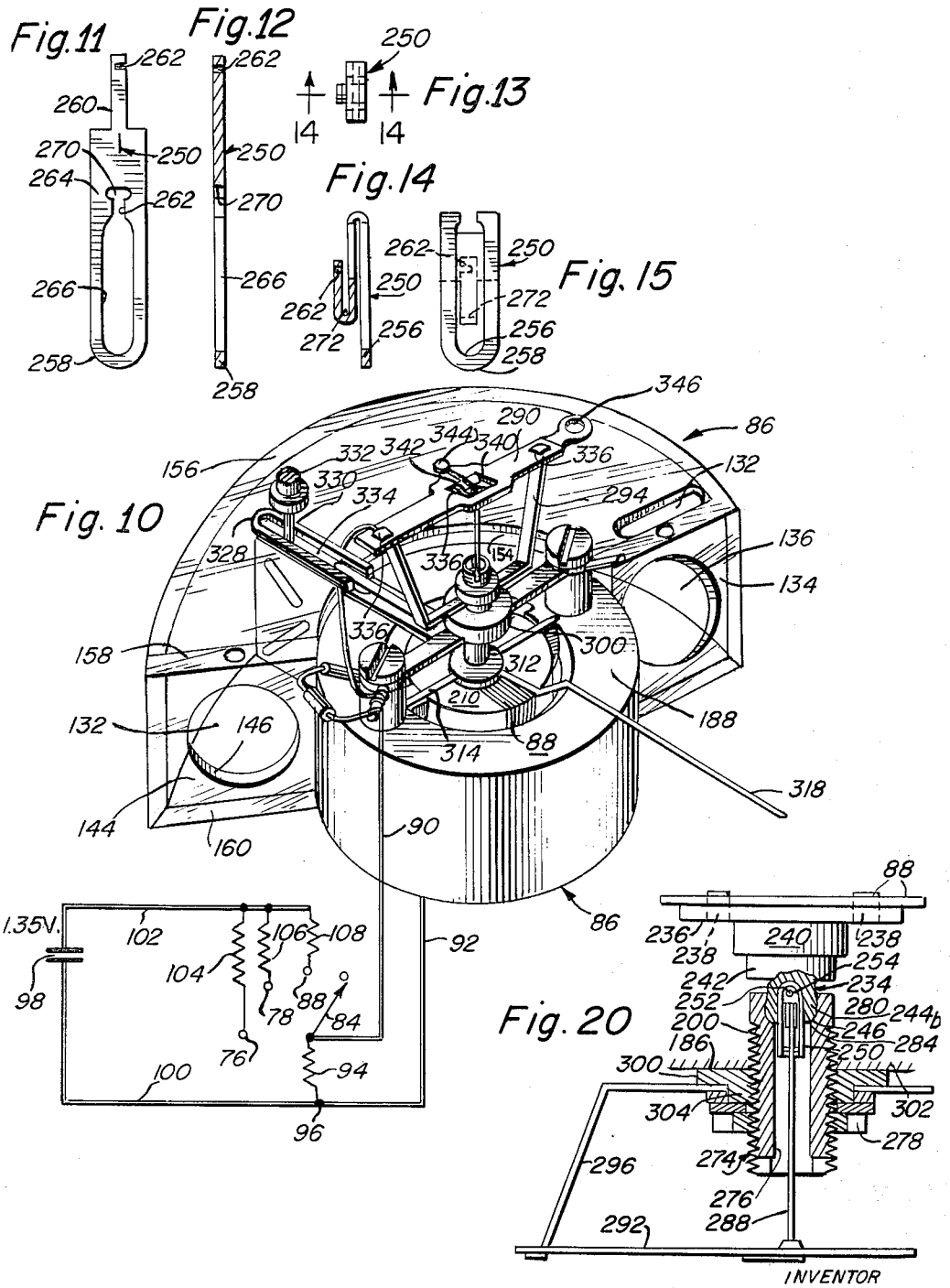
INVENTOR
Veikko K. Peltola
BY Robert H Wendt
ATTORNEY March 29, 1966 V. K. PELTOLA 3,242,730
AIR VELOCITY METERS
Filed Oct. 22, 1963 6 Sheets-Sheet 6
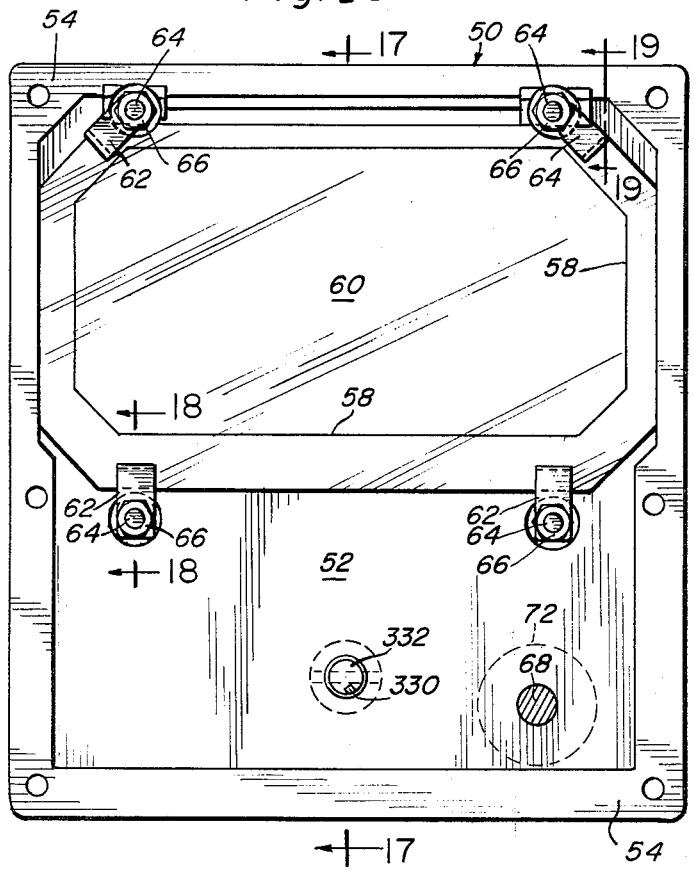
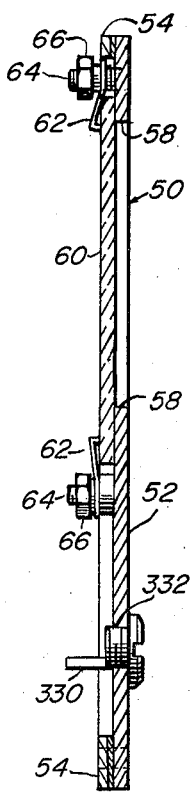
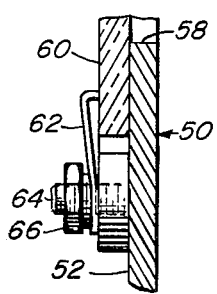
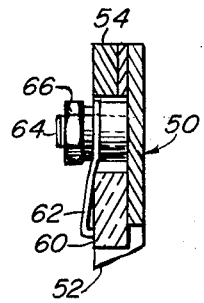
INVENTOR
Veikko K. Peltola
BY
ATTORNEY United States Patent Office 3,242,730
Patented Mar. 29, 1966

3,242,730
AIR VELOCITY METERS
Veikko K. Peltola, Chicago, Ill., assignor to Illinois Testing Laboratories, Inc., Chicago, Ill., a corporation of Illinois
Filed Oct. 22, 1963, Ser. No. 318,047
10 Claims. (Cl. 73—228)

The present invention relates to air velocity meters, and is particularly concerned with air velocity meters of the moving vane type.

Over the years, there have appeared certain limitations to which the air velocity meters of the prior art are subject, which indicate the need for certain improvements in the vane type air velocity meters of the prior art. One of the problems that has appeared, is the difference in damping characteristics between high range air velocity meters, and low range air velocity meters.

It appears that the low range air velocity meters are not adequately damped. This damping problem could be corrected by designing a movement specifically for the range of the air velocity meter. However, this procedure would be costly, and currently, the range of the instrument is changed by changing the strength of the restoring spring.

Another problem that has appeared over the years, is that it would be desirable to have a means for changing the range of an instrument, for different uses and applications.

Another problem that has been troublesome to some users of air velocity meters, is that the movement has not been rugged enough, and is easily damaged by rough usage. In particular, the pivots have become dulled from rough handling, requiring frequent repair.

One of the objects of the invention is the provision of an improved air velocity meter adapted to minimize or eliminate the aforesaid defects of the prior art air velocity meters.

Another object of the invention is the provision of an improved air velocity meter, in which a vane is attached to the pointer arm of a moving coil, D.C. galvanometer, and the coil of the galvanometer is connected to an adjustable shunt or a plurality of shunts of variable resistance, controlled by a switch, bridged across the moving coil, so that the current in the moving coil, sets up flux, which opposes the flux of the magnetic core of the galvanometer, and tends to damp the movement of the coil and pointer.

Another object is the provision of an improved construction for an air velocity meter, which is simple, which has a minimum number of parts, which is rugged, which is accurate, and which has a number of different ranges, and which may be manufactured at a low cost, and placed within the means of a large number of purchasers.

Another object is the solution of the problem of changing ranges in a new air velocity meter, by providing electrical suppression, and this was accomplished by connecting the direct current galvanometer through a current limiting resistor to a small 1.35 volt mercury cell, which will maintain a constant voltage and stable conditions for a relatively long period of time.

Another object is the solution of the problem of ruggedness in the new movement, by providing a taut band suspension for supporting the movement, for eliminating pivot breakage, and at the same time, eliminating the pivot friction which has been a problem on low range instruments, and by providing adjustable threaded pivots surrounding the taut band, and adjustable into positions where the movement of the band is definitely limited and protected against shocks and jars.

Another object is the provision of an improved air velocity instruments, utilizing a D'Arsonval galvanometer movement as part of the instrument, and adapted to be used as a flow meter and an air pressure measuring instrument.

Other objects and advantages of the invention will be apparent from the following description and the accompanying drawings, in which similar characters of reference indicate similar parts throughout the several views.

Referring to the drawings, of which there are six sheets,

FIG. 1 is a front view showing the top of the instrument housing in perspective;

FIG. 2 is a similar view with the cover removed;

FIG. 3 is an elevational view of the left end of the housing, taken on the plane of the line 3—3, looking in the direction of the arrows; in FIG. 2;

FIG. 4, is a top plan view, with the dial plate removed, on a larger scale, in partial section, showing the top of the movement and contents of the housing, on the plane of the line 4—4, looking in the direction of the arrows; in FIG. 2;

in FIG. 5;

FIG. 7, is a fragmentary sectional view, taken on the plane of the line 7—7, in FIG. 5, looking in the direction of the arrows;

FIG. 8 is a fragmentary bottom plan view 8—8, in FIG. 9, looking in the direction of the arrows, showing the electric switch;

FIG. 9 is a fragmentary side elevational view taken on the plane of the line 9—9 in FIG. 8, looking in the direction of the arrows;

FIG. 10 is a fragmentary top view in perspective, showing the movement and the wiring diagram and selector switch for changing the range of the instrument;

FIG. 11, is a plan view of the suspension anchor for anchoring the suspension band in the pivot bases carried by the coil, the anchor being shown in blank form;

FIG. 12 is a side elevational view taken from the right of FIG. 11, in partial section on the plane of the line 12—12, of FIG. 11;

FIG. 13 is a top plan view of the suspension anchor, greatly enlarged, after it is bent into final form, as shown in FIG. 14, and FIG. 15;

FIG. 14 is a side elevational view in partial section on the plane of the line 14—14, of FIG. 13, looking in the direction of the arrows;

FIG. 15 is a side elevational view of the suspension anchor, taken from the left of FIG. 14, looking in the direction of the arrows;

FIG. 16 is a bottom plan view of the cover of the housing;

FIG. 17 is a fragmentary sectional view, taken on the plane of the line 17—17, of FIG. 16, looking in the direction of the arrows;

FIG. 18 is a fragmentary sectional view, taken on the plane of the line 18—18, looking in the direction of the arrows, in FIG. 16;

FIG. 19 is fragmentary sectional view, taken on the plane of the line 19—19, in FIG. 16, looking in the direction of the arrows;

FIG. 20 is a fragmentary, enlarged, vertical sectional view of the lower part of FIG. 7, showing the details of the lower pivot, and taut band suspension of the moving coil;

FIG. 21 is an enlarged, vertical, axial, sectional view, taken through the axis of one of the limit screws of the pivotal suspension of FIG. 20.

Figure 5:
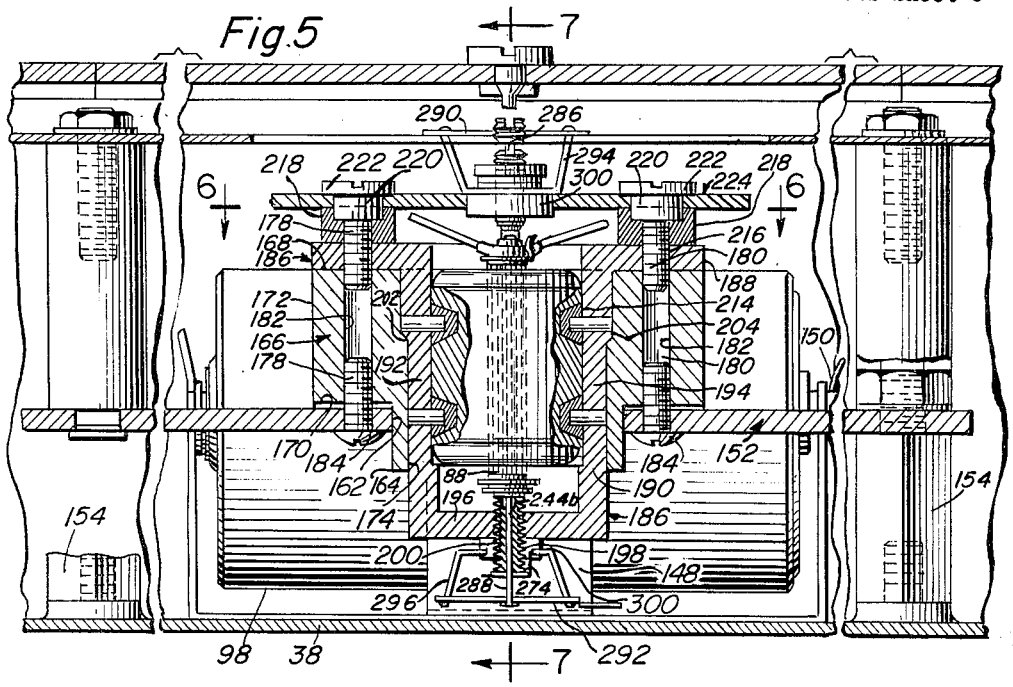
FIG. 5 is a fragmentary vertical sectional view, taken on the plane of the line 5—5, in FIG. 4; looking in the direction of the arrows.
Figure 6:
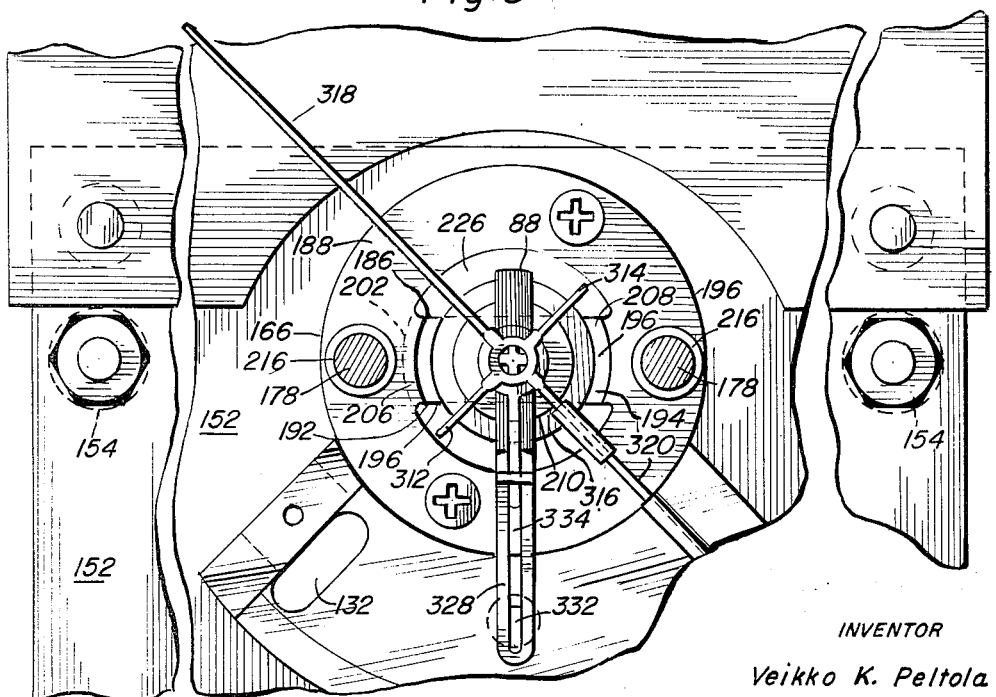
FIG. 6, is a fragmentary sectional view, taken on the plane of the line 6—6, looking in the direction of the arrows.

Referring to FIG. 1, 30 indicates in its entirety, the new air velocity meter, for measuring the velocity of air or other gases, and it is enclosed in a housing 32, having an air inlet 34, and an air outlet 36. The housing 32, may be rectangular or round, and serves to house the movement and to direct the air from the movement to the outlet, but for example, the housing 32, may have a flat bottom 38, four flat sides 40, 42, 44, 46, and an open top 48, closed by a cover 50.

The cover 50 is provided on its rear side 52, with a suitable gasket 54, which extends all around the cover at its lower side 52, and is compressed against the open top 48 of the housing 32, sealing the housing against ingress of dust or moisture, and preventing leakage of air from the housing 32. The cover 50 is secured to the side walls by a plurality of screw bolts 56, passing through the cover, and threaded into threaded holes in the housing.

The cover 50, has an opening 58, which is sealed and closed by a glass or plastic window 60, which is secured against the back side of the cover by clips 62, and screw bolts 64, and nuts 66. The cover 50 has an aperture for passing the shaft 68 of an electric switch 70, actuated by a knob 72, having a pointer 74, for indicating one of the ranges 76, 78, 80, and off position 82, which may be contacts engaged by a switch arm 84, FIG. 10, FIG. 1.

Referring to FIG. 10, the movement 86, has a moving coil 88, the ends of which are connected by conducting leads, 90, 92, to the switch arm 84, which is connected to a fixed resistance 94, which is connected to a conductor 96, and to lead 92, and a standard 1.35 volt mercury cell 98, is connected by conductors 100, and 102, in series with the fixed resistances 104, 106, 108, which in turn are connected to contacts 76, 78, 80.

Thus, when the switch arm 84 is moved into a closed circuit position, one of the resistances 104, 106, 108, is bridged across the moving coil, impressing the voltage of the mercury cell on the coil, and energizing the coil 88.

Referring to FIGS. 8 and 9, the switch 84 is mounted on a threaded collar 110, which is secured in the cover by a nut, and any conventional type of multiple contact switch may be used, or a potentiometer may be substituted for the switch.

Referring to FIG. 4, the housing 32, has its inlet 34, in the form of a tube, with a conduit 112 inside and an enlarged collar 114, having a threaded end portion 116, extending through an aperture 118, in the side wall 40, where the side wall has an inwardly extending threaded sleeve 120, carrying a threaded cap which secures the inlet to the side wall. The collar 114 has an enlarged counterbore 122, supporting a fine metal screen or sieve 124, for filtering out the dust, etc., and the cap 120 has a hole 126 for receiving the end portion of a metal conduit 128, having an inner cylindrical bore, leading to the vane chamber 132, through bore 130.

The metal conduit 128 is curved through an arc and extends through an opening 134, in the end wall 136 of the vane chamber 132, bringing the air under velocity into this end of the vane chamber, into engagement with the movable vane 138. At its other side wall 42, this side wall is provided with a pair of threaded collars 142 and 140, clamping the outlet pipe 36 in the side wall 42, permitting the air in the housing to be discharged into the air outside the housing. At its other end, the vane chamber 132, has its end wall 144, merely provided with an opening 146, discharging the air from the other side of the vane 138, and from the vane chamber 132 into the housing 32.

Referring to FIG. 4, the mercury cell 98 of FIG. 10, is held by a metal clip, 148, and is connected in the circuit of FIG. 10, by a conductor 150, and by being grounded at the other end.

Referring to FIGS. 4 and 5, the movement 86 is mounted on a base plate 152, mounted upon a plurality of metal studs, carried by the bottom 38, and secured by threaded members to the bottom and base plate.

The vane chamber 132, is formed of a suitable plastic, such as Lucite, having two curved inner and outer walls 154, 156, two radial end walls, 134, 144, having round apertures 134, 146, and upper and lower flat walls 158, 160, thereby defining a chamber 132, which is arcuate inside and rectangular in cross section for passing the vane 138 which is carried by the pointer arm, and the vane chamber 132 rests with its bottom on the base plate 152.

The base plate 152, has a central round aperture, 162, for receiving the downwardly projecting reduced tubular portion 164, of the pole piece 166, which is a cylindrical member of magnetic metal capable of being magnetized and has flat upper and lower end surfaces 168, 170, the lower end of the pole piece resting on the base plate 152. The outer surface 172 of the pole piece 166 is cylindrical and the inner surface is a cylindrical bore 174, and an upper larger counterbore 176. The pole piece 166 is secured on the base plate 152, by a pair of threaded bolts 178, 180, passing through parallel bores 182 in the pole piece 166, and through the base plate 152, against which the heads 184, are located. The pole piece 166 is adapted to receive the core bracket 186 carried by an upper circular plate 188, and the core bracket 186 has a U-shaped body 190 having two side walls 192, 194, and an end wall 196. The end wall 196 has a threaded central bore 198, for receiving a threaded sleeve 200 which surrounds the suspension member comprising a band at each end of the moving coil.

The core bracket walls 192, 194, have partially cylindrical outer walls 202, 204, and partially cylindrical inner surfaces 206, 208, and thus the core bracket 190 fits in the bore of the pole piece 166, and the core bracket 190 is adapted to receive the cylindrical (210) magnetic core, comprising a magnet of high coercive force frictionally mounted in the core bracket, and also supported therein by diametrically opposite metal pins 212, passing radially through the core bracket walls 192, 194, into bores 214, in the magnetic core 210, where they are frictionally secured.

The upper circular plate 188, of the core bracket 186, fits on the top plane surfaces 166, 170, of the pole piece 166, and the plate 188 has a pair of apertures 216, for passing the bolts 178, 180, which may be surrounded by spacers 218, having a bore and counter bore for receiving the head 220 of a pair of nuts 222, securing the bridge 224 above the core bracket 186, and the spacers 218 may be an integral part of the core bracket 186.

At the core bracket 186 has two walls 192, 194, fitting in the bore 206, 208 of the pole piece 166 this leaves two arcuate, annular air gaps 226 within which the moving coil 88 is adapted to move, when supported at each of its ends. Referring to FIG. 7, the moving coil 88 is there shown in elevation, and it comprises a coil of a plurality of turns of insulated fine coper wire, preformed into a rectangle with rounded corners covered and insulated with a layer of plastic, and having its two free ends arranged to be conected in the way of FIG. 10.

Each end 228, 230, of the moving coil 88, is provided with a pivot pin 232, 234, having a rectangular base plate 236, with rounded ends and a pair of apertures 238 used for receiving epoxy cement with which the pivot pins are secured to the ends of the coil, and the pivot pins each carry a succession of cylindrical integral bodies 240, 242, 244, axially located on the base 236 and on the coil 88 for supporting various parts and the uppermost or lowermost body 244 of each pivot pin has an axial bore 246, leading to a smaller counter bore 248 for receiving one end of the suspension ribbon at each end of the coil 88, and the ribbon is anchored in the bore 246, of each pivot pin 244, by a suspension anchor 250, of the type shown in FIGS. 13 to 15, the blanks for which are shown in FIGS. 11, 12. The bore 246 of each pivot pin 244, has a transverse bore 252, for receiving a pin for passing through said bore 252, and through the lowermost loop 256 of the anchor 250, to secure the anchor in the pivot pin, with the pin 254, this being the same with each anchor and pivot pin.

Referring to FIG. 11, this is an enlarged view of a plan view of the anchor for the suspension band used in the bore 246 of each pivot pin 244. This blank comprises a strip of sheet metal 250, which is rounded at its lower end 258, and having a narrow centrally located strip 260 at its upper end, with a laterally extending slot 262 at its extreme end.

The wider body 264 of the anchor 250, has a wider rectangle aperture 266 in its lower end, and the aperture is rounded at its lower end. The aperture 266 communicates with a narrower slot 268, at its uper end, and terminates in a wider portion 270.

When the blank of FIG. 11, is bent into the shape of FIG. 14, the slit 262 is used to receive the end of the suspension band, and it is soldered at the slot 262, as shown in FIG. 20. The anchor 250 then has a curved surface at the point 272 about which the band 274 passes, and then extends through the narrow slot 268, and out of the anchor 250 to the suspension spring carried by the bow at each end of the movement. The anchor 250 is located in the pivot pin with the band attached to the anchor, and it is finally anchored by the pin 254 in the hole 252 of the pivot pin at each end of the coil, as shown in FIG. 20.

Referring to FIG. 5, the threaded bore 198 in the lower end 196 of the core bracket 190, is adapted to receive a threaded sleeve 274, shown enlarged in FIG. 21. This sleeve 274 has an axially extending bore 276, and a screw driver slot 278 in its end, and the other end has an enlarged counterbore 280, leading to a frusto-conical bore 282, and the bore 280 receives and has a clearance about the pivot post end 244, which has a conical end surface 284. Thus the threaded sleeve, 274, surrounds the suspension band, which actually supports the moving coil, and the threaded member 274 limits the movement of the suspension band and the moving coil away from the axial position.

The thread member 274 may be driven by a screw drive into position where the conical surfaces 282 and 284 engage each other and then the moving coil is held against any rotation or axial movement.

Generally, when the air velocity meter is in use, the threaded members 274, adjacent each end of the moving coil, are moved into close proximity to the pivot body 244, at each end, and movement of the moving coil away from the axial position is definitely limited, so that shocks and jars to the instrument bring the surfaces 282 and 284 into engagement, and prevent further movement or damage to the instrument.

Since the moving coil 88 has a pivot surface 244, at each end, the upper pivot surface is designated 244a and the lower pivot surface 244b in FIG. 5, and the upper pivot pin is indicated at 232, and the lower pivot pin at 234, in FIG. 7.

The mounting for the moving coil 88, is a taut spring ribbon or band at each end of the moving coil, and the upper spring ribbon in FIG. 5, is numbered 286, and the lower ribbon 288, each ribbon being anchored to the moving coil 88, as shown in FIG. 20, and each ribbon being supported at its outer end by a taut transverse spring 290, at the top, and 292, at the bottom, as shown in FIG. 5. The transverse springs 290 and 292, are supported by a bow 294, at the top, and 296 at the bottom in FIG. 5, and the bows are carried by threaded members 274, FIG. 22, and the threaded members 274, are mounted in the threaded bore 198, of the core bracket end wall 196, at the bottom of FIG. 5, and in a threaded bore 298, in the bridge 224, at the top of FIG. 5.

Referring to FIG. 5, the taut band suspension at the bottom is simpler than that at the top, where it will be described in detail, and at the bottom, the threaded member 274 supports a threaded nylon jewel nut 300, having a base 302, engaging the bottom of the core bracket 186, and having a reduced end 304, received in a central bore in the bow 296, where the bow is secured on the threaded sleeve 274, by a washer on the reduced end 304, and by a suitable spring washer and nut, fixedly securing the bow 296 on threaded sleeve 274, and the sleeve 274 is the fixed mounting for the lower end of ribbon 288. The bow and transverse spring here are the same as at the top, which will now be described.

Referring to FIG. 5, at its upper end, the coil 88, the pivot pin 232, with its base plate 236, cemented thereto by epoxy, and having cylindrical bodies 240, 242, 244, and the pointer assembly 306, FIG. 10, has a circular body with a central hole, received on the cylindrical portion 242 against the body 240, with a connector clip 308 clamped on the body 242, and secured thereon by a jewel nut 310, and the pivot pin 232, terminates at its top in a cylindrical surface 244, and another conical surface 284, having a bore 246, in which a suspension anchor is located and held by pin 252, anchoring the lower end of the upper suspension ribbon 286.

The pointer assembly 306 has four arms, and the arm 318 carries the pointer which moves over the scale pan. The arms 312, 314, and 316, may carry short lengths of spiral balance springs to balance the pointer dynamically, and the rear arm 316, has an extension 320, which supports a downwardly extending air vane 322, in the vane chamber 132. The arm 316 projects through a slot 324, below the upper wall 158, so that the air vane 322, indicated generally as an assembly at 138, depends in the vane chamber 132, and is corrugated for strength.

The zero adjustment lever comprises two lever members 326, 328, rotatably mounted on the upper pivot of the moving coil and connected to the pointer in such manner as to rotate with it, being actuated by an eccentric pin 330, rotatably mounted on a stud 332, carried by the cover, and depending into a slot 334 in the zero adjustment lever 328. When the zero adjustment lever is moved, the suspension bands are twisted until the pointer reaches zero.

The bridge 224 supports an upper threaded sleeve 274, the enlarged bore 280 of which surrounds the pivot pin, and the bore 276 of which passes the suspension ribbon 286. This threaded sleeve 274, supports the upper bow, 294, and a plurality of nuts, also clamping a connection clip below the main nut. The bow 294 comprises a spring steel member of U-shape, supported by a central body having a bore on the threaded sleeve 274, and its arms extend upward and outwardly to support the transverse spring 290, extending from one end of the bow, to the other. The transverse spring 290, FIG. 10, has an aperture, 336, 336, in each end, through which the ends of the bow, project and are bent over outwardly to secure them. The transverse spring 290, has an enlargement 338 in its middle and an aperture 340, with an upwardly curved tab 342, and a pair of centering ears projecting to center the suspension ribbon, which passes up over the curved tab 342, and is bent laterally to be soldered to the ear 344, thus anchoring the upper end of the suspension ribbon.

One end of the moving coil is connected to the connector 346 on the end of transverse spring 290, and the other end of the moving coil to a clip carried by the moving coil assembly.

It will thus be observed that the moving coil is supported above and below by a tensioned spring ribbon, but there are coil pivots on the coil, and threaded sleeves embracing the pivots and preventing undue movement due to shock and preventing any wearing of the pivots, since the pivots will not engage the sleeves which have the appearance of bearings, and the moving coil is bridged through a resistance and a standard cell of fixed voltage, providing current in the coil and damping the movement of the coil.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An air velocity meter of the moving vane type, comprising a housing having a base wall, side walls, and a cover forming a closed air chamber, said housing having an air discharge port, an air velocity movement unit in said housing, said housing having a base plate spaced from the base wall and having a central aperture for said unit, said unit having a cylindrical pole piece formed with a reduced cylindrical axial portion fitting in said aperture of the said base plate, threaded means passing through said pole piece parallel to the axis of said pole piece and securing said pole piece to said base plate, a core bracket comprising a cast metal partially cylindrical member of U shape with a side wall formed with a partially cylindrical bore and a bottom wall having a threaded concentric bore in said bottom wall, and having radial apertures in said side wall, and said core bracket having at its upper end, a pair of radially outwardly extending bridge flanges, said threaded means passing through said bridge flanges, radial pins in said apertures in said side wall and a cylindrical core magnet fitting in said core bracket bore and secured by said pins extending into said core magnet, a bridge extending diametrically across the upper end of said core bracket and secured thereto by said threaded means, said bridge having an axial threaded bore, said core bracket and core having an arcuate annular air gap on each side, between the pole piece and core magnet, a moving coil of substantially rectangular shape with rounded corners, mounted in said air gap and having a pivot pin and base thereof secured to each end of said coil, a threaded sleeve axially mounted in the bridge at the upper end, and in the end wall of the core bracket at the other end of said coil, each of said sleeves supporting the central part of a resilient bow, a spring tensioned across the ends of each bow, an axial ribbon mounting for each end of the moving coil, each ribbon being anchored to the spring on each bow centrally thereof, at the outer end of said ribbon and to the moving coil at the inner end of the two ribbons, said ribbon passing through said threaded sleeve at each end of the movement, a pointer carried by the upper end of said pivot pin and base on said coil, an arcuate vane chamber carried by said base plate and located adjacent said pole piece and below said needle, said vane chamber having partially cylindrical concentric side walls and plane bottom and top walls and plane radial end walls, said needle having an arm projecting through a slot into said vane chamber below the upper wall of said vane chamber, an air vane carried by said arm in said vane chamber, said vane chamber having a discharge aperture at one of its ends and having an inlet port at its other end, said outlet port discharging into said housing and from said housing outlet port, an inlet conduit extending through the other wall of said housing and conducting air to the inlet port of said vane chamber, the air under velocity acting on said vane to move the vane, pointer, and moving coil, an adjustable resistance and a standard E.M.F. cell connected across the terminals of said moving coil to damp the movement of said coil in said air gap.

2. An air velocity meter according to claim 1, in which the threaded sleeves carried by the bridge and the core bracket, surrounding the pivot pins of the moving coil, may be moved on their threads into close relation to the pivot pins and their bases, to limit the movement of the ribbon supported moving coil to minimize the effects of shocks and jars on the movement.

3. An air velocity meter, according to claim 1, in which the suspension spring comprises an elongated metal member having a slot at each end for receiving the end of a bow to support the suspension springs, and the ends of the bow are bent outward to retain the suspension spring on the bow.

4. An air velocity meter, according to claim 3, in which the suspension spring is formed with a central aperture having a flange projecting into said central aperture and provided with a central end slot for centering the ribbon, and the flange has an upward curvature and the ribbon extends upward or downward over said curvature and laterally over a laterally projecting tab on the suspension spring, to which each ribbon is brazed.

5. An air pressure measuring instrument of the moving coil type, comprising a cylindrical pole piece, threaded means passing through said pole piece parallel to the axis thereof, a core bracket, comprising a metal member of substantially U-shape, having a cylindrical bore in the U portion thereof, and a threaded bore in the bottom wall thereof, a pair of outwardly extending bridge flanges carried by the upper end of said core bracket, secured by said threaded means, a cylindrical core magnet fitting in the bore of said core bracket, means for securing the core magnet in said core bracket, a bridge extending from flange to flange of said core bracket and secured by said threaded means, and having a threaded bore therein aligned with the threaded bore in said core bracket, said core bracket having an arcuate annular air gap on each side thereof, between the pole piece and the core magnet, a moving coil mounted in said air gap, and having a pivot pin at each end of said coil, a threaded sleeve mounted in the end of the core bracket, and in the bore of the bridge, the threaded sleeve being adapted to the movement into close proximity with each pivot pin to limit the movement of both pivot pins axially and out of axial position, a spring bow mounted on the threaded sleeve at each end of the moving coil, said bow supporting a transverse spring in each case, and a ribbon anchored in the center of each transverse spring, and extending axially through the threaded sleeve in each case, each ribbon being anchored in the pivot pin on each end of the moving coil, and providing a resilient spring mounting for the moving coil, a pointer arm carried by the moving coil and moving over a scale pan having a scale, carried by the instrument, an air vane carried by the pointer arm, an adjustable resistance and a standard cell in series with the resistance, and connected across the terminals of the moving coil, to damp the movement of the moving coil and pointer the said needle and moving coil being moved by the air vane, according to air flow.

6. An air pressure measuring instrument according to claim 5, in which the threaded sleeves carried by the bridge and core bracket, surrounding the pivot pins of the moving coil, may be moved on their threads to engage the pivot pins of the moving coil, to hold the moving coil in fixed position for shipment or storage.

7. An air pressure measuring instrument according to claim 5, in which the transverse spring supported by each bow, comprises an elongated metal member having a slot at each end, for receiving the bow to support the suspension spring in each case, and the ends of the bow are bent outward to retain the transverse springs on the bow.

8. An air pressure measuring instrument according to claim 5, in which the transverse spring supporting each suspension ribbon, is formed with a central aperture having a flange projecting into said central aperture, and said flange being provided with a central end slot for centering the ribbon, and the flange has an upward curvature and the ribbon extends over said curvature and laterally over a projecting tab on the transverse spring to which each ribbon end is soldered.

9. An air pressure measuring instrument according to claim 8, in which the moving coil is suspended at each end by a metal ribbon and the ribbon in each case is suspended from a transverse spring carried by a spring bow, and the transverse spring comprises an elongated member having a slot at each end for receiving the end of the bow to support the transverse spring, and the ends of the bow are bent outward to retain the transverse spring on the bow.

10. An air pressure measuring instrument according to claim 9, in which the transverse spring is formed with a central aperture having a flange projecting into said aperture and provided with an end slot for centering the ribbon, and the flange has an upward curvature and the ribbon extends over said curvature and laterally to be soldered to a projecting portion of said transverse spring.

References Cited by the Examiner

UNITED STATES PATENTS

| | | | |
|---|---|---|---|
| 2,539,788 | 1/1951 | Matcovich | 73—186 |
| 2,621,513 | 12/1952 | Zschokke et al. | 73—228 X |
| 3,164,018 | 1/1965 | Bennett | 73—228 |

OTHER REFERENCES

Collins et al.: "Torsion Vane Flowmeter for the Continuous Recording of Air Flow," from Journal of Scientific Instruments, vol. 39, March 1962, pp. 115–118.

RICHARD C. QUEISSER, *Primary Examiner.*

EDWARD D. GILHOOLY, *Assistant Examiner.*